United States Patent [19]

Iizuka

[11] Patent Number: 5,343,451

[45] Date of Patent: Aug. 30, 1994

[54] DIGITAL RECORDER

[75] Inventor: Nobuo Iizuka, Hamura, Japan

[73] Assignee: Casio Computer Co., Ltd., Tokyo, Japan

[21] Appl. No.: 965,180

[22] Filed: Oct. 23, 1992

[30] Foreign Application Priority Data

Nov. 14, 1991 [JP] Japan .................................. 3-326411

[51] Int. Cl.$^5$ ............................................ G11B 17/22
[52] U.S. Cl. ........................................ 369/32; 369/47
[58] Field of Search ...................... 369/32, 13, 83, 48, 369/59, 54; 360/13, 15, 14.1, 14.2; 395/425

[56]  References Cited

U.S. PATENT DOCUMENTS 4,410,917  10/1983  Newdoll et al. ....................... 369/84
4,833,549   5/1989  Yoshimoto et al. ................... 360/32
5,153,861  10/1992  Maeda et al. .......................... 369/83

OTHER PUBLICATIONS

JAS Journal, Apr. 1989, Japan Audio Society, Tokyo, Japan, pp. 16–22.

Primary Examiner—Robert J. Pascal
Assistant Examiner—Tan Dinh
Attorney, Agent, or Firm—Frishauf, Holtz, Goodman & Woodward

[57] ABSTRACT

There is a digital recorder which is capable of editing audio data read out from an audio-data storing device such as a hard disk and a magneto-optical disk, with high accuracy of a sampling frequency. When audio data stored on an audio-data storing disk is divided into a plurality of separate event data for reproduction, the event data are defined by sampling-data units, which units are used for defining digital audio data. When the audio data is transferred to a temporarily storing buffer, unnecessary portions of the event data near the leading portion and the ending portion of the event data are transferred as dummy data for fine adjustment.

18 Claims, 13 Drawing Sheets

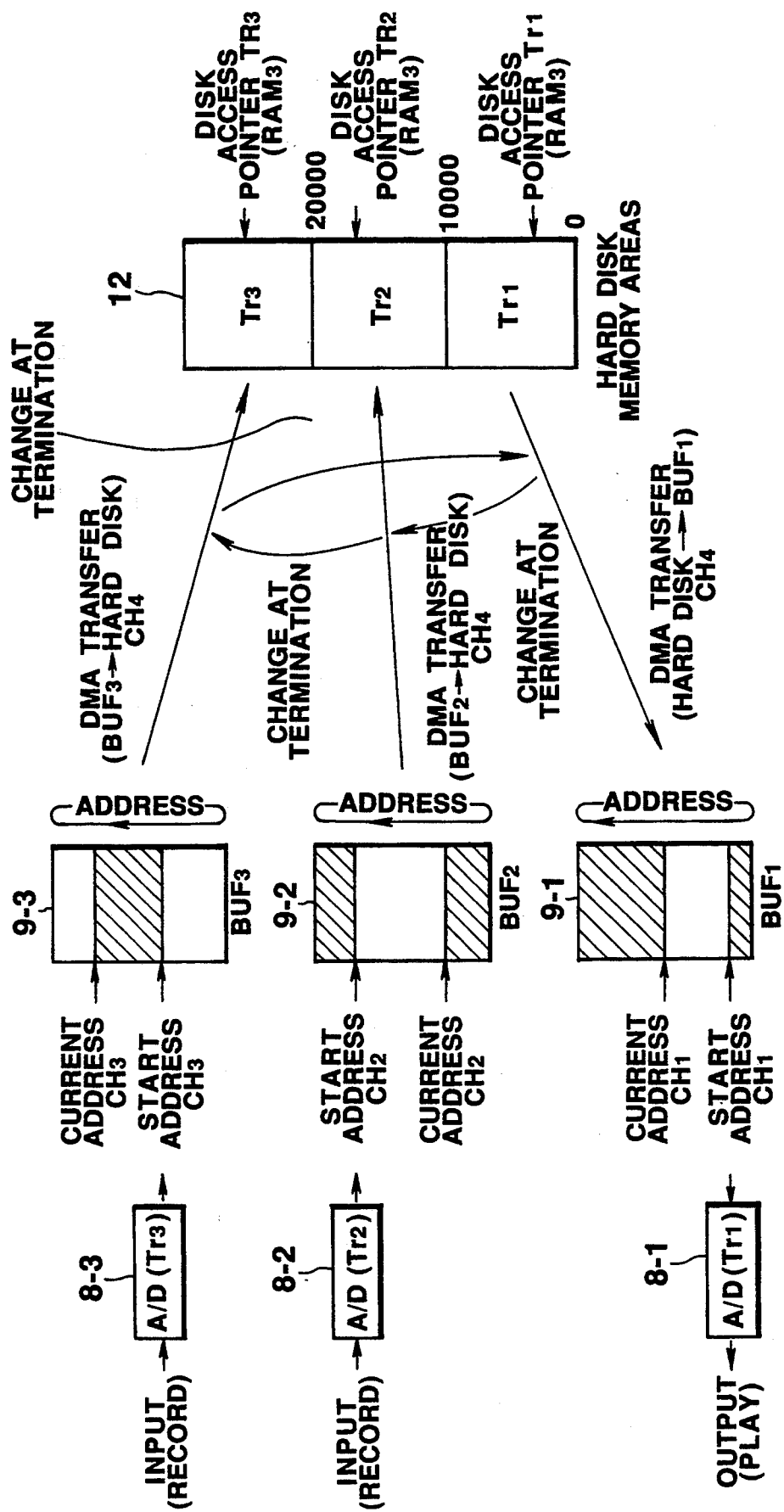

FIG.12

| | 1 | 2 | 3 | 4 | 5 |
|---|---|---|---|---|---|
| name | Track1 | Track2-1 | Track2-2 | Track3 | Intro_a |
| Id | 00 | 00 | 01 | 01 | 00 |
| adr3 | 00000000 | 00100000 | 00000000 | 00090000 | 00000412 |
| vol | 00100000 | 00070000 | 00090000 | 00100000 | 00009f49 |

ORIGINAL RECORDING DATA (columns 1–4)

| | 6 | 7 | 8 | 9 | 10 | --- | 20 | --- |
|---|---|---|---|---|---|---|---|---|
| name | take_1 | SE_a | fill_in | Melo_A | SE_1 | --- | Event X | --- |
| Id | 00 | 00 | 01 | 01 | 01 | --- | 01 | --- |
| adr3 | 00094B35 | 000f3b24 | 00053245 | 00009000 | 000ABCDE | --- | 00000A34 | --- |
| vol | 00002340 | 00007000 | 00009675 | 00010000 | 0000460F | --- | 00002305 | --- |

FIG.13

|  | 0 | 1 | 2 |
|---|---|---|---|
| Track1 | 1 | 0 |  |
| Track2 | 2 | 3 | 0 |
| Track3 | 4 | 0 |  |

FIG.14

|  | 0 | 1 | 2 | 3 | 4 | 5 | 6 | 7 | 8 |
|---|---|---|---|---|---|---|---|---|---|
| Track1 | 21 | 27 | 10 | 20 | 6 | 6 | 27 | 25 | 0 |
| Track2 | 7 | 21 | 5 | 21 | 18 | 11 | 0 |  |  |
| Track3 | 22 | 25 | 20 | 7 | 19 | 24 | 10 | 0 |  |

FIG.15

|  | Track1 | Track2 | Track3 |
|---|---|---|---|
| EST index | 1 | 3 | 2 |
| A TRANSFERRED-DATA AMOUNT | 00008650 | 00005400 | 00001509 |

DIGITAL RECORDER

BACKGROUND OF THE INVENTION

1. Field of the Invention

The present invention relates to a digital recorder which is capable of digitally recording, reproducing and editing a digital audio signal.

2. Description of the Related Art

For recording, reproducing and editing an audio signal, a method is conventionally used, of recording an analog audio signal on a magnetic tape, reproducing the same from the magnetic tape and editing the recorded signal. Since this prior art involves an analog recording and reproducing process, deterioration of the sound quality is inevitable. Particularly, deterioration is prominent when the once-recorded audio signal is dubbed.

The use of the magnetic tape as a recording medium raises other problems that it takes time to reach a target editing point, and edition requires that a target recorded potion of the magnetic tape be physically cut and pasted or be copies to somewhere else before executing the edition.

The problem about the deterioration of the sound quality can be overcome by employing a method of digitally recording data on a magnetic tape. However, there still remains a shortcoming concerning the freedom of locating the starting point or edition due to the use of a sequential-access type recording medium.

In recent, there has been proposed a solution to the conventional problems which uses a hard disk or a magneto-optical disk as a memory medium for disk-recording a digital signal such as the above mentioned audio signal, a video signal or a musical instrument digital interface (MIDI) signal.

For example, the following U.S. Patent Applications have proposed several solutions to these conventional problems:

U.S. Ser. No. 07/690,710 filed Apr. 24, 1991 (Nobuo IIZUKA);

U.S. Ser. No. 07/752,876 filed Aug. 30, 1991 (Atsushi MIYAKE);

U.S. Ser. No. 07/795,983 filed Nov. 22, 1991 (Nobuo IIZUKA);

U.S. Ser. No. 07/807,053 filed Dec. 12, 1991 (Nobuo IIZUKA);

U.S. Ser. No. 07/850,682 filed Mar. 10, 1992 (Atsushi MIYAKE);

U.S. Ser. No. 07/850,684 filed Mar. 10, 1992 (Atsushi MIYAKE); and

U.S. Ser. No. 07/871,241 filed Apr. 20, 1992 (Nobuo IIZUKA and Hajime MANABE).

In the case of the use of the external memory medium such as the hard disk or the magneto-optical disk for editing the audio signal in sampling-data units, some device will be required because the above memory medium allows only a read/write process of data in so-called physical sector units.

SUMMARY OF THE INVENTION

The present invention therefore has an object to provide a digital recorder which is capable of editing audio data in sampling-data units (1-2 bytes), even if the external recording medium such as the hard disk and the magneto-optical disk is employed which allows only to access data in predetermined units, for instance, physical sector (512 bytes) units.

According to one aspect of the invention, there is provided a digital recorder, which comprises:

audio input/output means for performing an input/output operation of audio data;

audio-data storing means for storing audio data supplied from said audio input/output means;

control means for forming a plurality of event data from the audio data stored in said audio-data storing means, and programming order of reproduction of the plurality of event data, whereby executing a random-access edition, and wherein said control means includes means for defining the event data using a sampling-data unit of the audio data.

With the above arrangement, access control for respective events is effected in the sampling-data units, and an editing of data with the high accuracy of the sampling frequency therefore will be expected.

Further, even though the above mentioned disk medium is employed as the audio data memory means and data access is allowed only in predetermined units such as physical sector units, an audio signal may be reproduced at the sampling intervals.

According to other aspect of the invention, there is provided a digital recorder which comprises:

audio input/output means for performing an input/output operation of an audio signal;

memory medium means for storing an audio signal, and effecting access to the audio signal in predetermined units;

event defining means for dividing the audio signal stored in said memory medium means into a plurality of events;

temporarily storing means for temporarily storing audio signals which are input from said audio input/output means at sampling intervals and supplying the audio signal in the predetermined units to said memory medium means, and for temporarily storing the audio signal in the predetermined units input from said memory medium means and supplying the audio signal in sampling units to said audio input/output means;

access control means for effecting a fine-adjustment of access to the audio signal when the audio signal supplied from said memory medium means is stored in said temporarily storing means in correspondence with a leading portion and an ending portion of the event, whereby allowing the audio signals of respective events to be reproduced at the sampling intervals.

In the above structure, a random access type recording medium disk such as the hard disk, an optical disk and the magneto-optical disk may be used as the above recording medium means, data may be accessed in the predetermined units or in physical-sector units, and the audio signal may be output through the audio input/output means at the sampling intervals under control of the access control means.

The above access control means includes controlling means for controlling to effect a dummy transfer of the audio signal which falls within a range from the very first portion of the predetermined unit to a portion corresponding to the leading portion of the event, from said memory medium means to said temporarily storing means, when the leading portion of the event does not coincide with the predetermined unit, and then to effect a data transfer of the audio signal to actually input the same to said temporarily storing means.

Further, the above access control means includes controlling means for controlling to effect a data transfer of the audio signal falling within a range from the very first portion of the predetermined unit to a portion corresponding to the ending portion of the event, from said memory medium means to said temporarily storing means, when the ending portion of the event does not coincide with the predetermined unit, and to effect thereafter a dummy transfer of the audio signal falling within other range remaining in the above predetermined unit.

Furthermore, an apparatus according to the present invention may take not only an arrangement including a recording medium which allows both a read process and a write process of audio data, but also may take an arrangement including a read-only-memory type medium.

There is provided an audio reproducing apparatus with the above arrangement. More specifically, there is provided an audio reproducing apparatus which comprises:

audio output means for performing an output operation of an audio signal;

memory medium means for previously storing an audio signal, and effecting access to the audio signal in predetermined units;

event defining means for dividing the audio signal stored in said memory medium means into a plurality of events;

temporarily storing means for temporarily storing the audio signal in the predetermined units input from said memory medium means, and supplying the audio signal in sampling units to said audio output means; and access control means for effecting a fine-adjustment of access to the audio signal when the audio signal supplied from said memory medium means is stored in said temporarily storing means in correspondence with a leading portion and an ending portion of the event, whereby allowing the audio signals of respective events to be reproduced at sampling intervals.

It would be apparent for those skilled in the art from the following description of preferred embodiments that the present invention may be arranged, modified in various manners as well as applied to other cases.

BRIEF DESCRIPTION OF THE DRAWINGS

Other objects and structures of the present invention will be more fully understood by those skilled in the art from the following description of the preferred embodiments and the accompanying drawings.

FIG. 9 is a view illustrating concept of whole operation of a digital recorder of FIG. 1;

FIG. 12 is a view illustrating an example of an event table in the embodiment of FIG. 1;

FIG. 13 is a view illustrating an example of an event sequence table of original recording data in the embodiment of FIG. 1;

FIG. 14 is a view illustrating an example of an event sequence table defined by a user; and FIG. 15 is a view showing an example of current data.

DETAILED DESCRIPTION OF THE PREFERRED EMBODIMENTS

Now, preferred embodiments of the digital recorder according to the present invention will be described with reference to the accompanying drawings.

<Whole Structure>

Figure 1:
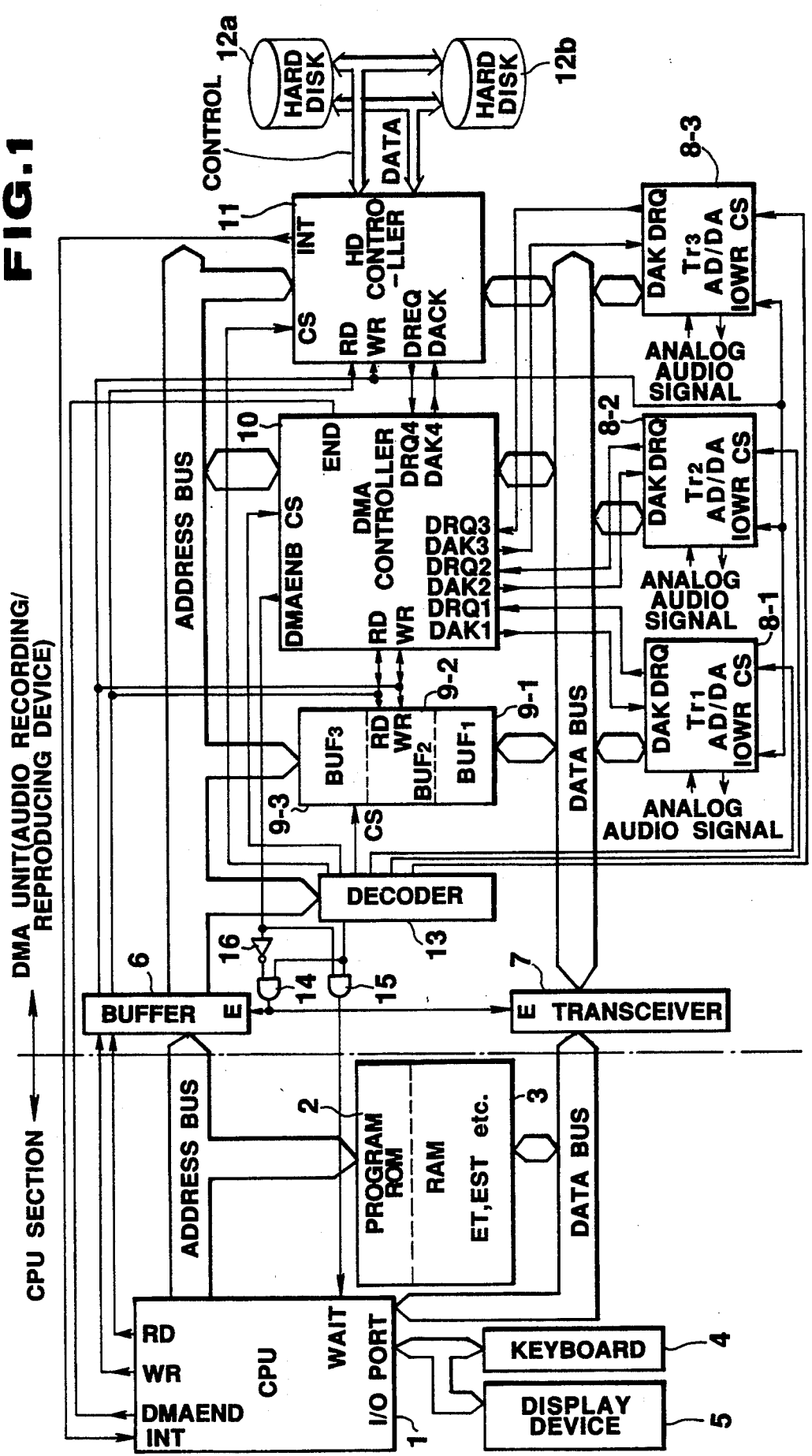
FIG. 1 is a block diagram of an embodiment of a digital recorder according to the present invention.

FIG. 1 is a view showing the whole structure of the embodiment of the digital recorder according to the present invention, which is arranged such that a recording and reproducing operation is simultaneously performed with respect to up to three tracks. The whole structure is composed of a CPU section (a left side portion of the drawing) and a DMA unit (a right side portion of the drawing), as shown in FIG. 1.

The CPU section comprises a CPU 1, a program ROM 2 which stores a program (to be described in detail later) for specifying operation of the CPU 1, a RAM 3 for storing various data, a keyboard 4 and a display device 5. The RAM 3 includes an area for storing various data, an area for storing a three-track access pointer, an area for storing an event table (ET), an area for storing an event sequence table (EST) and a work area. The event table (ET) includes identification data (an event title) each for identifying audio data (an event) and memory location (a disk ID, a leading address and an event length). The above individual audio data correspond to those data respectively, which audio data stored in hard disks 12a and 12b are manually or automatically divided into. The event sequence table includes the identifying data for identifying events included in the event table (ET), which data are arranged for each track in an order of reproduction of the events. The keyboard 4 and the display device 5 are peripheral devices connected to an I/O port of the CPU 1. The display device 5 includes a cathode ray tube (CRT) display or a liquid crystal display (LCD) for displaying various indications.

As will be described later, in a real-time operation mode such as in a recording/reproducing mode, the CPU 1 controls individual components in the DMA unit as needed while an address bus and a data bus in the DMA unit are not busy. Further, the CPU 1 rearranges data block and operates a disk access pointer in an editing mode. Setting of the recording/reproducing mode for each track (hereafter, referred to as "Tr"), and designation of a starting point, stopping point, locating point and editing point can be effected using the keyboard 4, as will be described later. An address signal is sent from the CPU 1 through the address bus to address terminals of the program ROM 2 and RAM 3, which have output terminals connected to the CPU 1 and a transceiver 7 through the data bus.

A buffer 6 and the transceiver 7 are provided in the DMA unit to connect the CPU section and the DMA unit to each other. The buffer 6 is connected to the CPU 1 via the address bus, and to an address bus in the DMA unit. The transceiver 7 is connected to the CPU 1 via the data bus and to a data bus in the DMA unit.

Provided in the DMA unit are an audio input/output device 8-1 for Tr 1, an audio input/output device 8-2 for Tr 2 and an audio input/output device 8-3 for Tr 3, which will independently receive or output an analog audio signal.

The audio input/output devices 8-1 to 8-3 each include a converter for selectively executing A/D or D/A conversion, a low pass filter for eliminating sampling noises and a clock circuit for generating a clock signal having a sampling period. When a track is set in a record mode, the relevant audio input/output device filters an analog audio signal supplied from the outside every sampling period, and executes A/D conversion on the signal, obtaining digital audio data. When the track is set in a play mode, the relevant digital audio data which has been read out in advance is subjected to D/A conversion every sampling period, and is then properly filtered, and is output as an analog audio signal from the relevant input/output device.

The audio input/output devices 8-1 to 8-3 for Tr 1 to Tr 3 are connected via the data bus to buffers 9-1 (BUF 1), 9-2 (BUF 2) and 9-3 (BUF 3) respectively, for exchanging digital audio data therewith.

The buffers 9-1 to 9-3 correspond to Tr 1 to Tr 3, respectively, and exchange data with the audio input-/output devices 8-1 to 8-3 respectively through direct memory accessing method (DMA) under control of a DMA controller 10.

In the record mode, the audio input/output devices 8-1 to 8-3 request the DMA controller 10 for DMA transfer (single transfer) of digital data which is associated with one sampling from the audio input/output devices 8-1 to 8-3 to the buffers 9-1 to 9-3 at the sampling intervals. That is, the audio input/output devices 8-1 to 8-3 send DRQ signals to the DMA controller 10 (signal DRQ 1 from Tr 1, DRQ 2 from Tr 2 and DRQ 3 from Tr 3). The data transfer will actually be executed in accordance with the response from the DMA controller 10, i.e., when the DMA controller 10 sends back a signal DAK 1 to Tr 1, a DAK 2 to Tr 2 and a DAK 3 to Tr 3, as an acknowledgement of the DRQ signals.

In the play mode, the audio input/output devices 8-1 to 8-3 request the DMA controller 10 for the DMA transfer (single transfer) of digital data associated with one sampling from the buffers 9-1 to 9-3 to the audio input/output devices 8-1 to 8-3 at the sampling intervals. Then, the data transfer is executed by the DMA controller 10 as described above.

The buffers 9-1 to 9-3 each have a memory capacity which will store digital audio data of several samplings, and are arranged to function as FIFO buffers. For example, the RAM is divided into three portions for Tr 1 to Tr3, and each portion is used as a ring buffer (a buffer whose ending address and leading address are imaginarily linked together) which has a function of a FIFO buffer.

The buffers 9-1 to 9-3 are addressed through the address bus by the DMA controller 10. In other words, while the DMA transfer is being executed, the address bus, the data bus and a control signal line in the DMA unit will be occupied by the DMA controller 10.

The buffers 9-1 to 9-3 exchange data with the hard disks 12a and 12b through the data bus under control of a hard disk controller (hereafter, referred to as "HD controller") 11. The hard disks 12a and 12b and the HD controller 11 are connected to each other through the data bus and the control signal line. The HD controller 11 controls every read/write access to the hard disks 12a and 12b. The hard disks 12a and 12b each have three separate memory areas for the respective tracks Tr 1 to Tr 3. The DMA controller 10 serves to execute the data transfer between the hard disks 12a, 12b and the buffers 9-1 to 9-3. That is, the HD controller 11 sends an interrupt signal (INT) to the CPU 1 after the data transfer of one data block has been finished, and further sends the CPU 1 an instruction to transfer the following data block, and then the DMA controller 10 is allowed to execute the data transfer. Upon receipt of the interrupt signal INT from the HD controller 11, the CPU 1 sets the DMA controller 10 and the HD controller 11 to the desired mode, or performs programming thereof, and then allows the data transfer to be executed. A detailed description of the data-transfer operation will be given later.

In the play mode, the DMA controller 10 reads out a predetermined amount (corresponding to amount of data to be processed in plural sampling periods) of digital audio data from the hard disks 12a and 12b, and functions to execute the DMA transfer (block transfer) to a designated buffer among the buffers 9-1 to 9-3. In the record mode, the DMA controller reads out a predetermined amount (corresponding to amount of data to be processed in several sampling periods) of digital audio data from the designated buffer, and conducts the DMA transfer (block transfer) of the data to specified positions on the hard disks 12a and 12b.

For the data transfer between the hard disks 12a, 12b and the buffers 9-1 to 9-3, the HD controller 11 sends a request signal DREQ to the DMA controller 10 (the DMA controller 10 receives the signal as DRQ 4). When the data transfer is ready for execution, the HD controller 11 receives a response signal DACK from the DMA controller 10 (the DMA controller 10 sends the signal as DAK 4), entering an actual data-transfer mode.

As described above, the DMA controller 10 performs a time-sharing data-transfer on four channels: data transfer on three channels between the audio input/output devices 8-1 to 8-3 for Tr 1 to Tr 3 and the buffers 9-1 to 9-3 (three channels CH 1 to CH 3, as will be described later) and data transfer on one channel between the hard disks 12a, 12b and a buffer alternatively selected from among the buffers 9-1 to (one channel CH 4).

CPU 1 supplies an address signal to the buffer 6 via the address bus to control the functions and operations of the components in the DMA unit. The CPU 1 further supplies designating signals CS for designating the components through the buffer 6 to a decoder 13, and then sends the relevant designating signals CS to the audio input/output devices 8-1 to 8-3, the buffers 9-1 to 9-3, the DMA controller 10 and the HD controller 11. At the same time, CPU 1 exchanges various data with these components through the transceiver 7 via the data bus.

Further, the CPU 1 sends a designating signal WR, which designates whether the audio input/output devices 8-1 to 8-3 should be set to the record mode (a write mode) or the play mode (a read mode), to IOWR terminals of the audio input/output devices 8-1 to 8-3 through the buffer 6.

The CPU 1 sends the designating signal (a write signal) WR and another designating signal (a read signal) RD to the buffers 9-1 to 9-3, the DMA controller 10 and the HD controller 11 through the buffer 6, for reading data from or writing data in these components. The DMA controller 10 also outputs these signals RD and WR in a data transfer mode. The relationship among these signals and the functions and operations of the components will be described later.

The DMA controller 10 sets a DMA enabling signal DMAENB to "1" and outputs the same while the DMA transfer is being executed among the components. As a result, an output of a gate circuit 14 to which the signal DMAENB is supplied through an invertor 16 becomes "0". An enabling signal E is sent as "0" to the buffer 6 and the transceiver 7, to disable the CPU section and the DMA unit to exchange data and addresses with each other. When a signal of "1" has been supplied to an AND gate 15 from the decoder 13 in this case, the output of the gate 15 will be "1", allowing a wait signal WAIT to be supplied to the CPU 1.

If DMA transfer should start while the CPU 1 is sending a predetermined signal to the decoder 13 to enable the buffer 6 and the transceiver 7 in order to control the DMA unit, i.e., while the CPU 1 is sending a signal of "1" from the decoder 13 to one of the input terminals of the AND gate 14 When the CPU 1 outputs an address signal for accessing anyone of the buffers 9-1 to 9-3, the DMA controller 10, the HD controller 11 and the audio input/output devices 8-1 to 8-3, the output of the decoder 13 becomes active, sending the output signal of "1" to one input terminal of each of the AND gates 14 and 15), the CPU 1 receives the signal WAIT to execute the DMA transfer by priority over other operations. After the DMA transfer is completed, the WAIT is released to restart the operation of the CPU 1.

Even if the CPU 1 tries to access the DMA controller 10, while the DMA controller 10 is executing the DMA transfer, the signal WAIT is sent from the AND gate 15 to the CPU 1, and the execution cycle of the CPU 1 is made longer to disable the buffer 6 and the transceiver 7 during this period.

In short, the CPU 1 can access the components in the DMA unit under the following two conditions:
(1) when the CPU 1 outputs an address to access individual components in the DMA unit, and
(2) when signal DMAENB is inactive ("0"), i.e., when the data bus in the DMA unit is not busy.

The CPU 1, however, can continue processing without considering when to access the DMA unit in accordance with the action of gates 14 and 15.

To alter the operation state of the DMA unit immediately in response to a key input or the triggering by the control data, the CPU 1 can send a command DMA-END to the DMA controller 10 to stop DMA transfer what ever state the controller 10 is in (the command is sent as an END signal to the DMA controller 10).

<Structure of Essential Portions of DMA of Controller 10>

One example of the structure of the DMA controller 10 will now be explained. The DMA controller 10 can transfer data in a bus cycle of several hundred nanoseconds. Therefore, it takes one to two microseconds to transfer sampling data for three tracks.

With a sampling frequency fs of 48 KHz, one sampling period will be approximately 21 microseconds. It is possible to assign most of the sampling period to the time for data transfer among the buffers 9-1 to 9-3, the HD controller 11 and the hard disks 12a, 12b, and the time for the CPU 1 to program the individual components.

Figure 2:
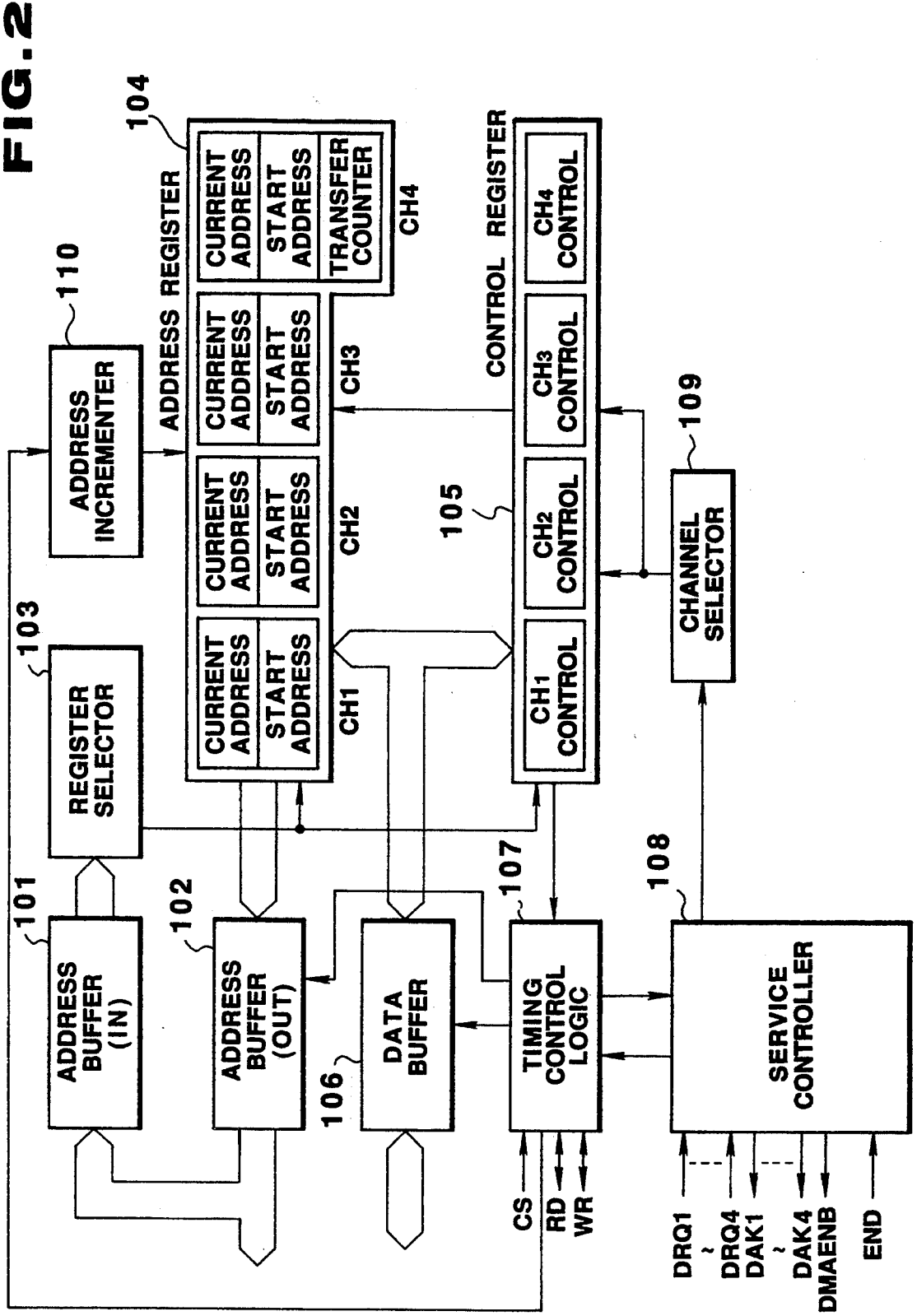
FIG. 2 is a block diagram of a main portion of DMA controller of FIG. 1.

The structure of the essential portions of the DMA controller 10 is exemplified in FIG. 2. The DMA controller 10 has an address buffer 101 on its input side (IN) to be connected to the address bus and an address buffer 102 at its output side (OUT). In accordance with the address signal supplied to the address buffer 101 on the input side, what is designated by the a register selector 103 is changed to designate desired registers or a transfer counter which is prepared in an address register 104 and a control register 105.

The address register 104 and the control register 105 each have areas for four channels CH1 to CH 4. The channels CH1 to CH3 are registers for executing the DMA transfer between the buffers 9-1 to 9-3 and the audio input/output devices 8-1 to 8-3, and the channel CH4 is a register for executing the DMA transfer between the hard disks 12a, 12b and the designated buffer among the buffers 9-1 to 9-3.

The registers for the channels CH1 to CH4 in the address register 104 each have a memory area for storing at least current addresses and start addresses of the corresponding buffer 9-1, 9-2 or 9-3 and a designated buffer. The channel CH is further provided with the transfer counter. When the DMA transfer of data, the number of which data is set in the transfer counter, has been completed, the DMA operation stops even though the DMA request from the HD controller 11 continues. The individual areas for channels CH1 to CH4 in the control register 105 store control data for designating the direction of DMA transfer.

The contents of the address register 104 and the control register 105 are allowed to be input from and output to the data bus through a data buffer 106. A timing control logic 107, a service controller 108 and a channel selector 109 control these components.

The service controller 108 is of a hard logic type or of a micro program control type. The service controller 108 receives a signal from the timing control logic 107, the DMA request signals DRQ 1 to DRQ 4 from the audio input/output devices 8-1 to 8-3 and the HD controller 11 and a DMA interrupt command (DMAEND) from the CPU 1, and outputs response (acknowledge) signals DAK 1 to DAK 4 to the above components and a DMA enabling signal DMAENB indicating that DMA transfer is on. Further, the controller 108 outputs various commands to the timing control logic 107, and a channel selecting signal to the channel selector 109. The channel selector 109 selectively designates registers corresponding to the individual channels CH1 to CH4 in the control register 105.

The timing control logic 107 receives a designating signal CS from the decoder 13, a control signal from the control register 105 and a control signal from the service controller 108, and controls input/output operations of the address buffer 102 and the data buffer 106. Further, the timing control logic 107 enables an address incrementer 110 to increment the current address register of the designated channel in the address register 104, and to reset the current address register to a start address of the buffer assigned to the designated channel when the current address register reaches the final address assigned to the channel.

<Whole Operation of CPU 1>

Figure 3:
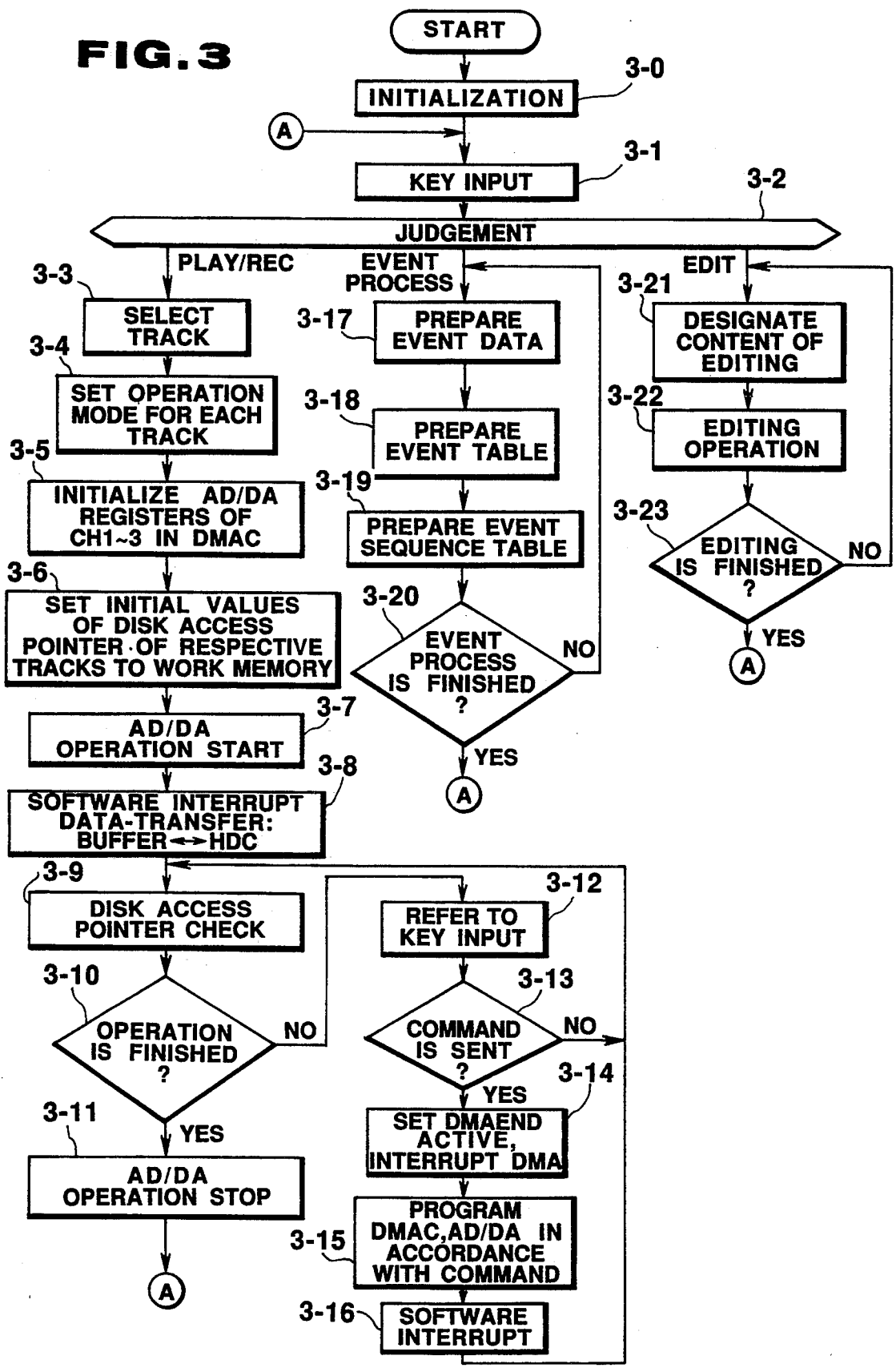
FIG. 3 is a flow chart of a main routine process of CPU of FIG. 1.
Figure 4:
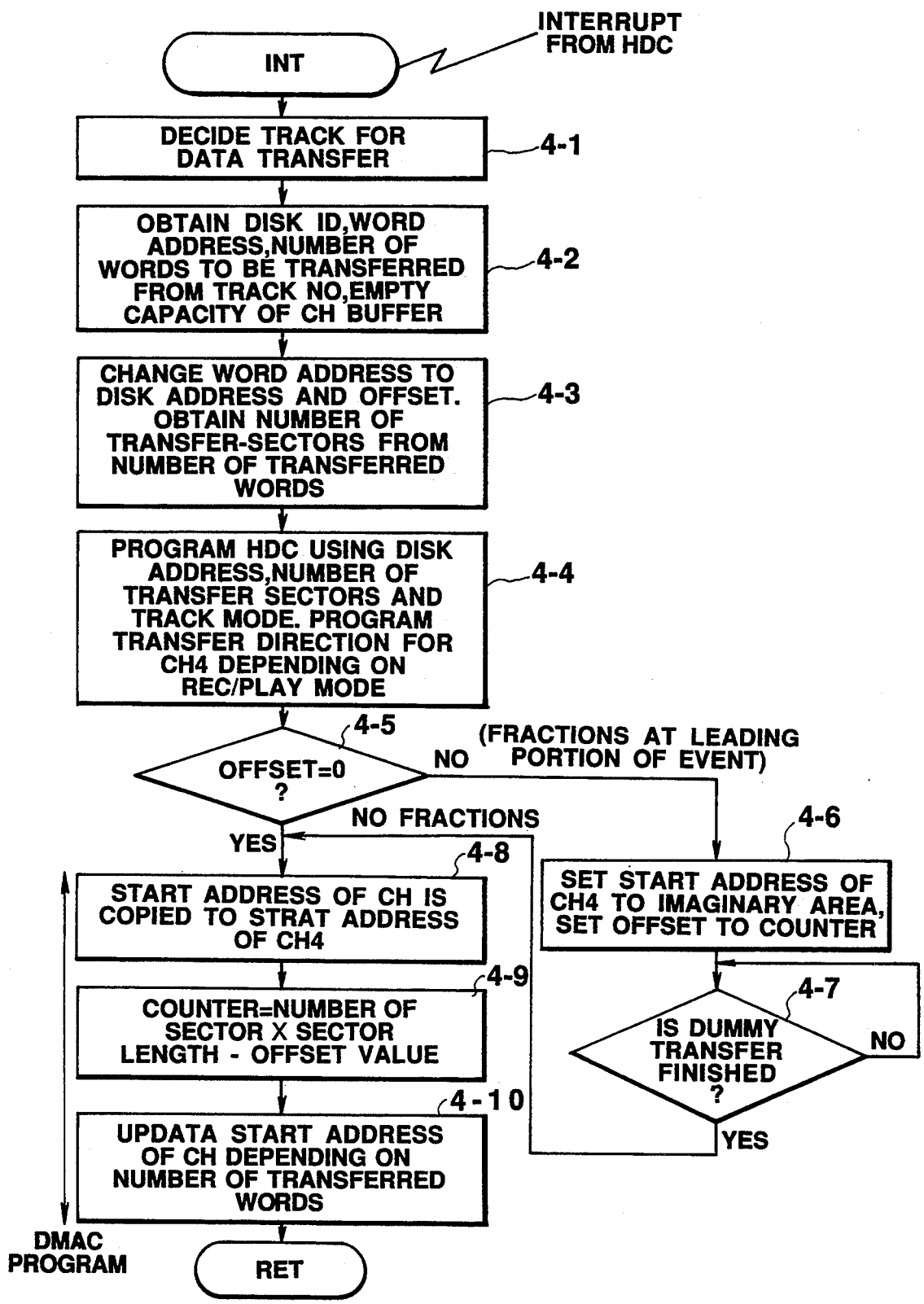
FIG. 4 is a flow chart of an interrupt routine process of CPU of FIG. 1.
Figure 5:
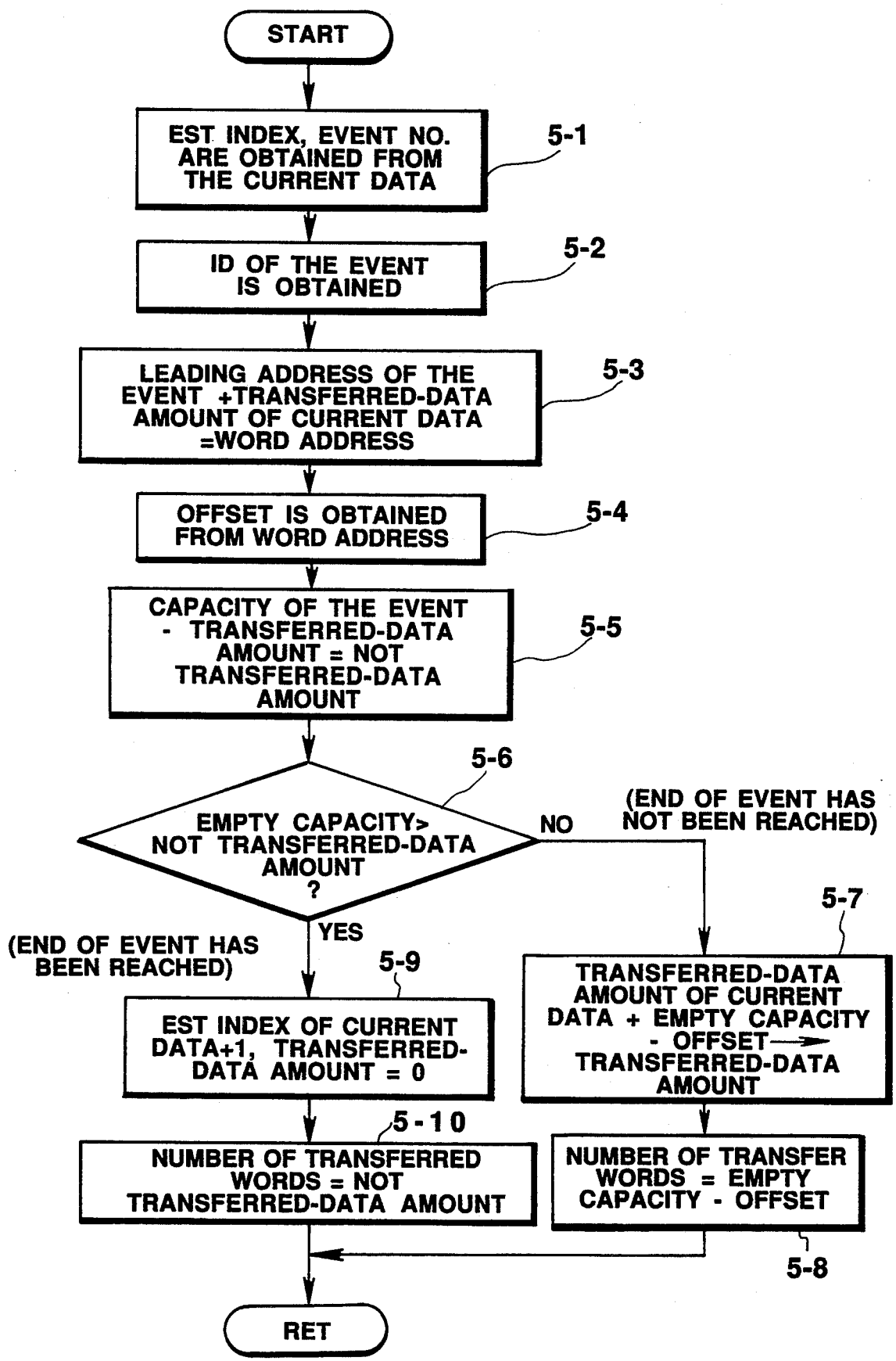
FIG. 5 is a flow chart illustrating a particular process at a step in the interrupt routine process of FIG. 4.

Now, the operation of the embodiment will be described hereafter. Flowcharts of the operation of the CPU 1 are shown in FIGS. 3, 4 and 5. These routine processes are executed in accordance with a program (software) stored in the program ROM 2. FIG. 3 is a flowchart of the main routine process of the CPU 1, and FIG. 5 is a flowchart of an interrupt routine process to be executed by the CPU 1 in response to receipt of the interrupt signal INT from the HD controller 11. FIG. 5 is a flowchart of a detailed process at step 4-2 of the interrupt routine process of FIG. 4.

In FIG. 3, the CPU 1 starts the main routine operation in response to a power on operation. The CPU 1 sets various initial conditions at step 3-0. Receiving a key input at step 3-1, the CPU 1 judges at step 3-2 what operation mode has been set.

Judging the record/play mode is set at present, the CPU 1 advances from step 3-2 to step 3-3, where it sequentially selects and designates three tracks, and further advances to step 3-4, where the CPU 1 sets the operation modes for respective tracks in accordance with input instructions from the keyboard 4. The CPU 1 sequentially outputs at step 3-5 the designating signals CS through the buffer 6 and the decoder 13 to the audio input/output devices 8-1 to 8-3, supplying them with IOWR, and decides which operation of A/D conversion and D/A conversion the individual devices 8-1 to 8-3 should execute. Now, we assume that the play mode (where D/A conversion is to be executed) is set for the track Tr 1, and the record mode (where A/D conversion is to be executed) is set for the tracks Tr 2 and Tr 3. FIG. 9 is a view showing concept of whole operation of the digital recorder, when the digital recorder has been set to the operation modes as described above.

At step 3-5, the CPU 1 allows the DMA controller 10 to initialize addresses of the buffers 9-1 to 9-3 for the tracks Tr1 to Tr3. In other words, the CPU 1 sets initial setup data to the registers (the address registers 104 and the control registers 105) for the respective channels CH1 to CH3 through the data buffer 106 while permitting the address buffer 101, the register selector 103 and the channel selector 109 of FIG. 2 to designate the registers.

The buffers 9-1 to 9-3 are arranged to be used circularly as ring buffers. At the initial condition, the buffers 9-1 to 9-3 are arranged such that their start addresses and current addresses coincide with each other (the state is schematically shown in FIG. 9 in which the start addresses and the current addresses of the buffers 9-1 to 9-3 are stored in the address registers 104 for channels CH1 to CH3 to be controlled).

Further, the CPU 1 executes process of step 3-6, respectively setting to initial states the disk access pointers corresponding to the respective tracks Tr1 to Tr3 of the hard disks 12a, 12b provided in the work memory area of the RAM 3 (FIG. 9 shows relationship between the memory areas in the hard disk 12 and the disk access pointers).

The CPU 1 allows at step 3-7 the audio input/output devices 8-1 to 8-3 to start executing A/D conversion or D/A conversion on received data. At step 3-8, the CPU 1 issues a software interrupt to execute the processing similar to the process that is executed when the HD controller 11 makes a program request for the data transfer between the hard disk 12 and one of the buffers 9-1 to 9-3 (that is, when the HD controller 11 sends the interrupt signal INT to the CPU 1), as will be described later.

More specifically, CPU 1 executes the process of step 3-8, in accordance with flow charts of FIGS. 4 and 5. Structures of the tables to be stored in the RAM 3 of FIG. 1 will be described before the flow charts of FIGS. 4 and 5 are explained. An event table (hereafter, referred to as "ET") and an event sequence table (hereafter, referred to as "EST") for controlling a reproduction schedule as shown in FIGS. 12 to 15 are defined in the RAM 3 of FIG. 1, which is provided with a memory area for storing current data, i.e., intermediate data of these tables.

An example of a registered event table is illustrated in FIG. 12. Event data to be stored in the event table is composed of an event title (an event name), a disk ID (id), which designates either of the hard disk 12a (00) or the hard disk 12b (01), the leading data address (sample (word) data address) (adrs) and event length (the number of sample data) (vol). In the event table shown in FIG. 12, original recording data "1" to "4" are automatically generated by securing an area in the record mode.

FIG. 13 is a view illustrating an example of the EST of original recording data. In the EST, EST indexes "0" to "2" are arranged in the lateral direction, and the track numbers are arranged in the longitudinal direction, and the event numbers are stored at the relevant positions in the EST. For example, FIG. 13 is a view which illustrates that data (2 and 3) of the track 2 are stored in an area spanning the hard disks "00" and "01". The event number "0" is for indicating the final terminal of a sequence element.

In FIG. 14 is illustrated an example of the EST, in which a work of No. 1 written by a user is stored. In the EST, events which are defined by the user himself to be output from a particular track are arranged in the relevant track column. Similarly, the EST indexes "0" to "8" are disposed in the lateral direction and the track numbers are disposed in the longitudinal direction, and event numbers are stored at relevant positions in the EST. Therefore, a plurality of ESTs are prepared for respective works.

Current data which are being transferred by the DMA transfer are shown in FIG. 15. The EST index numbers for respective tracks to be DMA-transferred at the following transfer, and the number of events (number of transferred events) which have been already transferred are memorized.

Operation of the CPU 1, which will be performed when the event sequence of FIG. 14 defined by the user is reproduced, will be described with reference to the flow charts of FIGS. 4 and 5.

Figure 10A:
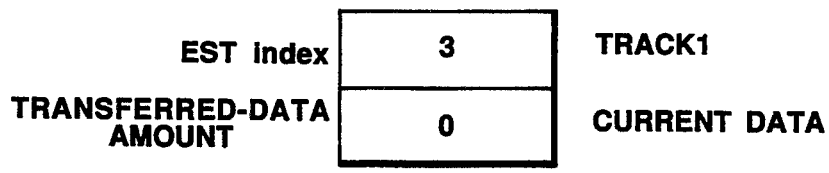
FIG. 10(A-E) is a view illustrating concept of operation of the digital recorder of FIG. 1 to be executed at a starting point of an event.

When the leading portion of an event is designated at intermediate positions of sector lengths of the hard disks 12a, 12b, and is read and transferred to a buffer, the current data will become shown in FIG. 10(A). With respect to Tr 1, the channel CH1 corresponding to Tr 1 is selected as the channel of the DMA controller 10 at step 4-1 to perform DMA transfer of digital signal data from the hard disks 12a, 12b to the buffer 9-1.

At step 4-2, a disk ID, a word address, a transfer address are obtained form a track number and an empty capacity (a capacity available for data transfer) of the channel buffer. The detailed flow chart of the process at step 4-2 is shown in FIG. 5. The process is performed on the premise that the empty capacity is calculated in units of the sector by omitting fractions.

Figure 10B:
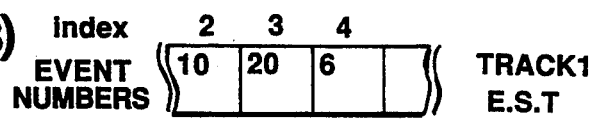
Figure 10C:
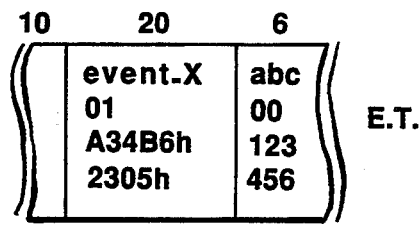

At step 5-1 of FIG. 5, EST index (=3) (FIG. 10(A)) and an event number (=20) (FIG. 10(B)) are obtained from the corresponding current data. At step 5-2, the ID (=01) of the event is obtained from the event table shown in FIG. 12. The word address is calculated at step 5-3 from the following equation: "the leading address of the event+the amount of current data which have been already transferred (a transferred-data amount)=a word address". The leading address of the event is obtained from the event table shown in FIG. 12 and the amount of current data which have been already transferred (the transferred-data amount) is obtained from the current data shown in FIG. 15.

CPU 1 obtains at step 5-4 an offset (word) (=B6 h) from the word address (a disk address representing a sector (1 sector=100 h))(=A34 h) as shown in FIG. 10 (C). At step 5-5, an amount of data which have not been transferred (a not transferred-data amount) is calculated from the following equation: "the capacity of the event−the transferred-data amount=a not transferred-data amount". The capacity of the event is obtained from the event vol shown in FIG. 12, and the transferred-data amount is obtained from the current data of FIG. 15. CPU 1 judges at step 5-6 if "an empty capacity (for example, 200 h)>a not transferred-data amount" is true. When the result of the judgement at step 5-6 is "NO", the following arithmetic operation is performed at step 5-7: "an transferred-data amount of the current data (=0)+an empty capacity (=200 h)−an offset (=B6h)=a transferred-data amount (=14Ah=200h−B6h)", because the end of the event has not been reached. At step 5-8, "the number of transferred words =an empty capacity−an offset" is set. Since the empty capacity is calculated in units of the sector by omitting fractions for the second transfer and after, data transfer is performed in units of the sector as will be described. Meanwhile, when the result of the judgement at step 5-6 is "YES", the index of EST of the current data is incremented by "+1" and the transferred-data amount is set to "0" at step 5-9, because the end of the event has been reached. At step 5-10, "the number of transferred words=a not transferred-data amount" is set.

Figure 10D:
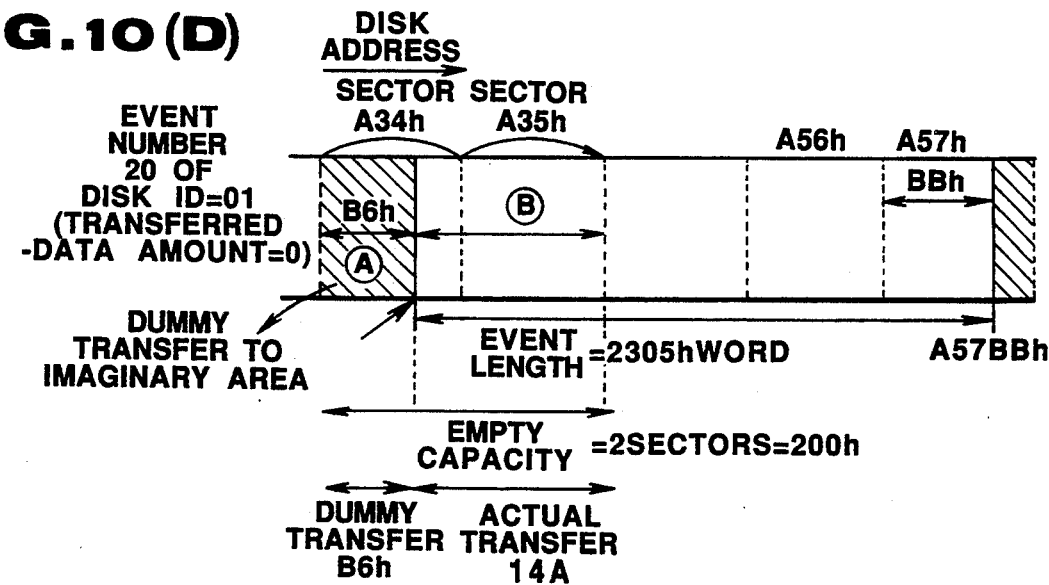

Returning to the flow chart of FIG. 4, CPU 1 expresses the word address by a disk address and an offset, and obtains the number of transfer-sectors from the number of the transferred words. The number of transfer-sectors is decided by units of the sector by omitting fractions, because data of less than sector can not be transferred. At step 4-4, CPU 1 programs the HD controller 11, using the disk address, the number of transfer-sectors and the track mode. Further, the data-transfer direction on CH4 is programmed depending on the record mode or play mode (data are transferred from the buffers 9-1 to 9-3 to the hard disks 12a, 12b while data are transferred in the opposite direction in the play mode). CPU 1 judges at step 4-5 if "the offset=0" is true. When "NO", it is judged that the position of the leading portion of the event locates in the sector including fractional data as shown in FIG. 10(D). In the case that the sector includes fractional data, CPU 1 sets, at step 4-6, in an imaginary area (which does not exit actually) the start address CH 4 of the address register 104 in the DMA controller 10 and sets an offset value to the above transfer counter, effecting a dummy transfer of data corresponding to the portion A (a portion of B6h) shown in FIG. 10(D).

Figure 10E:
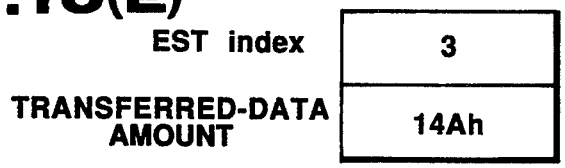

When it is judged at step 4-5 that the dummy transfer has finished, or when the result of the judgement at step 4-5 is "YES", processes at steps 4-8 to 4-10 are performed. In other words, the transfer of data corresponding to the portion B other than the portion A for the dummy transfer in FIG. 10(D) is set in the processes at steps 4-8 to 4-10. More specifically, the start address of the relevant CH (in this case, CH 1) of the address register 104 is copied to the start address of the CH 4 at step 4-8. The value of the transfer counter is set to "the number of sectors ×the sector length−an offset value", where the number of the sectors is 2, the sector length is 100h and the offset value is B6h. Further, the start address of the relevant CH is updated using the number of the transferred words (=14 Ah) obtained at step 5-8, whereby the current data of the track 1 becomes as shown in FIG. 10(E). Then, CPU 1 returns to the main routine process of FIG. 3. In this manner, the following address will become A3600h (=A34B6h+14Ah), and coincide with a boundary between the sectors.

FIG. 11 is a view illustrating a process performed by CPU 1 for processing an event end. FIGS. 11(A) to 11(E) correspond to FIGS. 10 (A) to 10 (E) illustrating processes executed at the leading portion of an event, respectively. When the transferred-data amount is 204AH, the not transferred-data amount is 200h+BBh as shown in FIGS. 11 (A) and 11 (D), data of 300h (three sectors) which is larger than the not transferred-data amount will be transferred if the empty capacity of the buffer is, for example, 500h. As shown in FIG. 11 (E), the current data is updated to the following index number 4, and the transferred-data amount is updated to updating state of address in the buffer. Data retained in the range of the buffer from the current address upwards to the top and from the bottom upwards to the start address as viewed in FIG. 11 (F) are data which have not been unsounded. The range from the start address upwards to the current address is assigned to data which have been sounded, in which range new data are written. Data to be actually written and read out are stored in the range from the start address to a start address to be updated, but data shown as ineffective data are actually transferred, too.

While an event is being divided and transferred, the number of transferred words is equivalent to a multiple of the number of words in one sector. Particularly complex process therefore is not required.

At step 4-6 of FIG. 4, the dummy transfer of data is effected to the imaginary area (area which is not actually prepared). Similar effects are obtained even though data are transferred not to the imaginary area but to the area in the buffer for storing data other than those which have not been sounded. But, in this case, the start address must be obtained from the register 104 of the DMA controller 10. In the case that data are transferred to the imaginary area, efficiency is improved a little because the start address is set at a fixed address representative of the leading portion of the imaginary area, and only the transfer counter of the address register 104 is programmed.

Figure 11A:
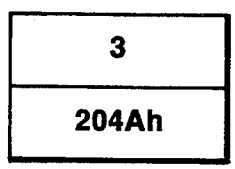
FIG. 11(A-F) is a view illustrating concept of operation of the digital recorder of FIG. 1 to be executed at a finishing point of the event.
Figure 11B:
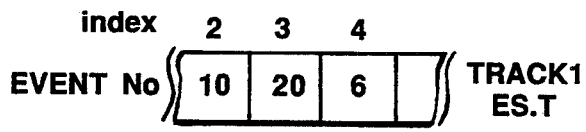
Figure 11C:
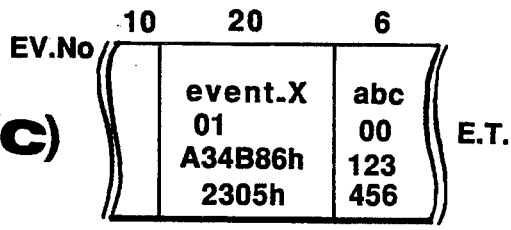
Figure 11D:
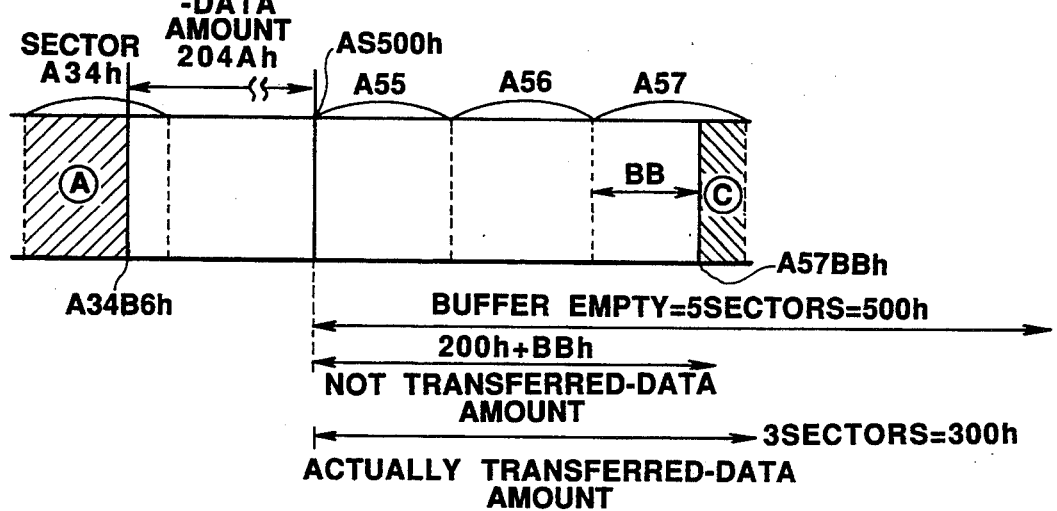
Figure 11E:
Figure 11F:
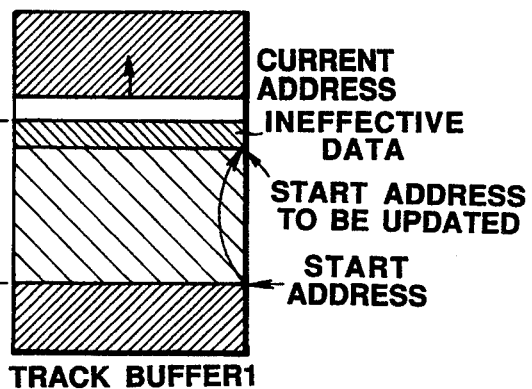

On the contrary, no problems are caused because ineffective data at the ending portion of an event are not necessary to be transferred to the imaginary area, and the start address can be updated based on the number of transferred words. At step 5-10, since the not transferred-data amount (=200h+BBh) has been set as the number of transferred words, the ineffective data shown in FIG. 11(F) are regarded as having been dummy-transferred.

Now, CPU 1 returns to the flow chart of FIG. 3. As will be clear from the later description, once the first interrupt routine process (FIG. 4) is caused and the HD controller 11 is enabled, the HD controller 11 initiates an interrupt, i.e., the HD controller 11 sends the INT signal to CPU 1 every time the transfer of data block designated by CPU 1 has been finished. CPU 1 therefore makes only judgement as to whether the record/-play operation has been finished, or whether a key input is entered or it is triggered in accordance with instruction included in control data.

More specifically, CPU 1 refers to the disk access pointer (RAM 3) at step 3-9, and judges at step 3-10 if a memory area is overflowed, i.e., if the operation is finished. When "YES", CPU 1 allows at step 3-1 the audio input/output devices 8-1 to 8-3 to stop executing A/D conversion or D/A conversion. When "NO", CPU 1 refers to a key input state at step 3-12. If no change in the key input state has been found, CPU 1 returns to a process at step 3-9, and repeatedly executes processes of steps 3-9 to 3-13.

When some changes in the key input state have been found, CPU 1 advances from step 3-13 to step 3-14, where CPU 1 interrupts DMA transfer, and outputs the DMA interrupt command (DMAEND) to the DMA controller 10 for effecting new setting. Further, CPU 1 programs at step 3-15 the DMA controller 10 and the audio input/output devices 8-1 to 8-3 in accordance with newly input command, and advances to step 3-16, where it executes the interrupt routine of FIG. 4 in order to start the DMA operation again. Then, CPU 1 returns to step 3-9.

In the play/record mode, CPU 1 effects an initialization at steps 3-4 to 3-8, and repeatedly executes processes at steps 3-9, 3-10, 3-12, 3-13 and further steps 3-14 to 3-16, wherein CPU 1 interrupts the DMA transfer control immediately and alters the program in response to a command of alteration (for example, pause (interrupt of the A/D conversion and D/A conversion) or a punch in/punch out (switching of the A/D conversion and D/A conversion)) with respect to a given track sent from the keyboard 4 or changes in control data obtained in the editing mode. Then, CPU 1 operates to execute similar processes.

When CPU 1 judges at step 3-2 that an event process mode has been set at present, then CPU 1 advances from step 3-2 to step 3-17, where audio data stored in the hard disk 12 (12a, 12b) is converted into event data. That is, continuous audio data on a time axis is divided into a plurality of separated audio data (events), and data representative of event names (title) for designating the separated audio data and data representative of disk ID and separated spaces (start points and the lengths (volume)) are produced. Then, an event table (ET) of FIG. 12 is prepared for the events at step 3-18. Event names, disk ID, start points and volume are registered in the event table. The disk ID, start points and volume correspond to start addresses and event lengths of the hard disk, on which a relevant event is stored.

At step 3-19, an event sequence table EST of FIG. 14 is prepared based on the above event table. The event processes at steps 3-17 to 3-19 will be repeatedly executed, and when an instruction of an operator to stop preparing the EST is detected at step 3-20, CPU 1 returns to step 3-1, where it checks the key input state again.

When CPU 1 judges at step 3-2 that an edit mode has been set at present, then the CPU 1 advances from step 3-2 to step 3-21, where it judges at which track and point editing should be made and how editing should be made (for example, timing of a sound stored at a point designated for a given time is shifted before or after, is amended or the sound is deleted). Then, the CPU 1 executes various editing operations at step 3-22. The editing operations will not be described particularly in detail. Various operations are performed under the control of the CPU 1, such as programming of access points on the hard disks 12a, 12b, to which the HD controller 11 and the DMA controller 10 are allowed to access to read out data, data transfer to the RAM 3, various editing operations using the RAM 3, re-storing operation of edited digital audio data to the hard disks 12a, 12b, designation of access points, and so on. When it is Judged at step 3-23 that the editing operation has been finished, the CPU 1 returns to step 3-1, where it checks the key input state again.

<Operation of Audio Input/Output Devices 8-1 to 8-3>

Figure 6:
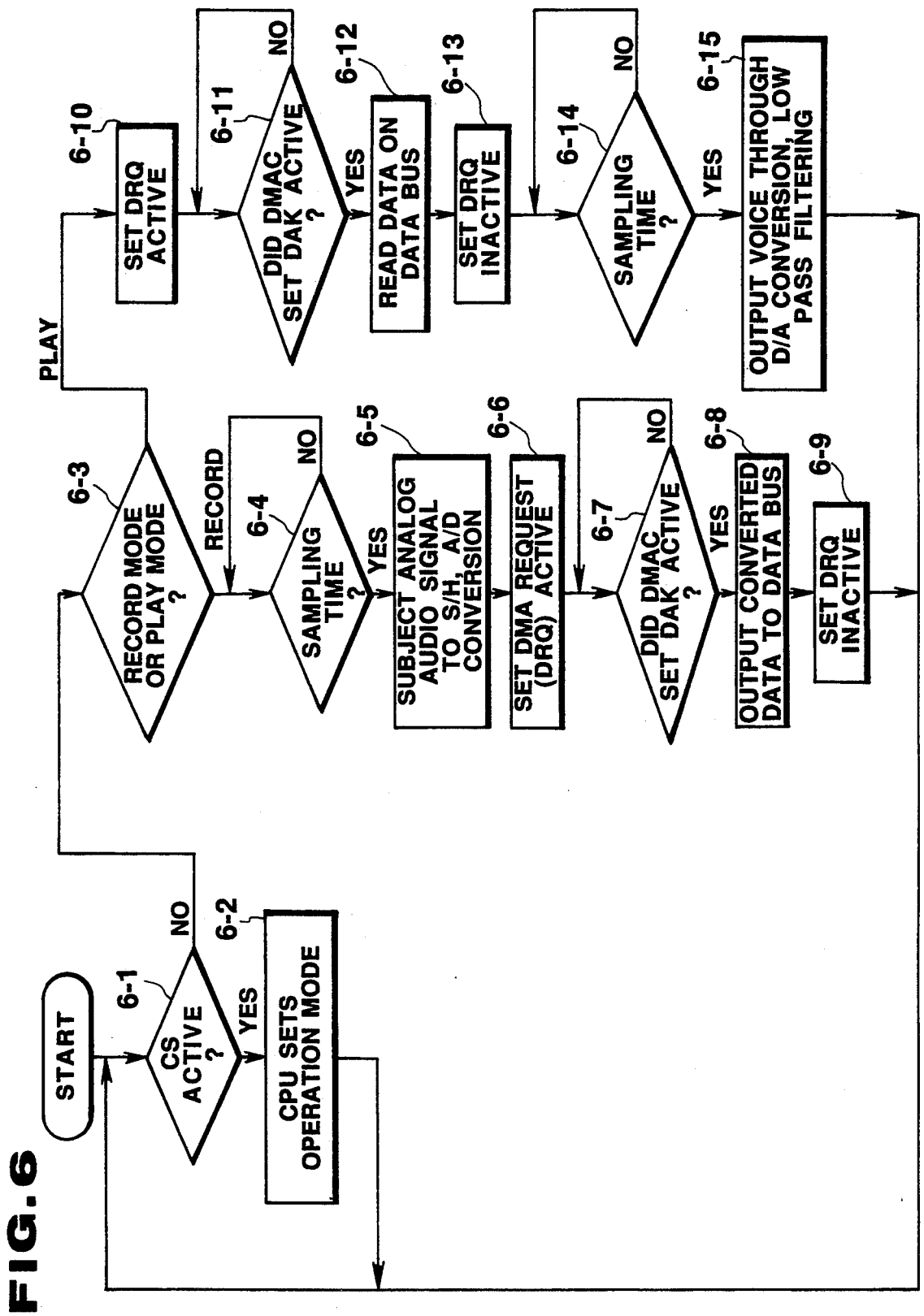
FIG. 6 is a flow chart of operation of audio input/output units 8-1 to 8-3 in FIG. 1.

The operation of the audio input/output devices 8-1 to 8-3 will now be described referring to the flowchart of FIG. 6. This flowchart may be realized by either microprogram control or hard logic control, and there are various types of means to accomplish the functions.

It is judged step 6-1 whether or not the designating signal CS for designating the audio input/output device has been sent from the CPU 1, i.e., whether the signal is active or not. When the result of the judgement is "Yes", an operation mode (record mode, play mode or stop mode) is set by the CPU 1 at step 6-2. This setting process is to be executed in response to processing at steps 3-5 and 3-15 in the main routine process.

When the result of the judgement at step 6-1 is "No", it is judged if the audio input/output devices 8-1 to 8-3 are in the record mode or in the playing mode. If it is judged at step 6-3 that the devices are in the record mode, the operation advances from step 6-3 to steps 6-4 to 6-9. Meanwhile, if it is judged at step 6-3 that the devices are in the play mode, the operation advances to steps 6-10 to 6-15.

A description will be given of the operation of the audio input/output devices set to the record mode (the audio input/output devices 8-2 and 8-3 in this case). It is judged at step 6-4 if a sampling time has been reached. The process at step 6-4 will be repeatedly executed until the sampling time is reached. The audio input/output devices 8-1 to 8-3 may have hardware timers respectively, and judge the sampling time based on their outputs. Otherwise, a common hard timer may be provided so that each audio input/output device can be driven by the timer output. It will be understood from the later description that the sampling frequencies of the audio input/output devices 8-1 to 8-3 may be set to values different from one another.

When the judgement at step 6-4 is "YES", the transferred analog audio signal is subject to sample holding (S/H) and A/D conversion. The audio input/output devices set the DMA transfer request signal DRQ active and output the request signal to the DMA controller 10 at step 6-6.

Receiving the DMA transfer request signal DRQ, the DMA controller 10 outputs the response signal DAK to execute DMA transfer. When the judgement at step 6-7 is "YES", the audio input/output device 8-1, 8-2 or (the audio input/output device 8-2 or 8-3 in this case) goes to step 6-8, where the device outputs the audio data subjected to A/D conversion via the data bus to the corresponding buffer 9-1, 9-2 or 9-3 (the buffer 9-2 or 9-3 in this case). The DMA transfer request signal DRQ is then made inactive at step 6-9. Therefore, the audio input/output device 8-2 or 8-3 in this case converts, every sampling period, the externally supplied analog audio signal into a digital audio signal, and transfers the digital signal to the current address of the buffer 9-2 or 9-3 which is designated by the DMA controller 10, as will be described later (refer to FIG. 9).

When it is judged at step 6-3 that the audio input/output device is set to the play mode, the operation goes to step 6-10, where the DMA transfer request signal DRQ to the DMA controller 10 is made active. Upon receipt of the response signal DAK from the DMA controller 10 at step 6-11, the audio input/output device reads the digital audio data on the data bus at step 6-12, and then sets the DMA transfer request signal DRQ inactive at step 6-13. As shown in FIG. 9, through the above operation, the content of the current address of the buffer 9-1 corresponding to the track Tr1 (where the content of the Tr1 area of the hard disk 12 has been transferred and stored) will be set to the audio input/output device 8-1. Then, it is judged at step 6-14 if the sampling time has been reached. The detection of the sampling time is effected in the similar manner to that executed at step 6-4.

When it is judged at step 6-14 that the sampling time has been reached, the operation goes to step 6-15, where the digital audio signal is subjected to D/A conversion and low-pass filtering operation. Then, the analog audio signal is audibly output.

The operations of the audio input/output device set in the record mode and the play mode at a single sampling time have been described. After the processes at steps 6-9 and 6-15 have been executed, the operation returns to step 6-1 to sequentially execute the processing at the following sampling times in the similar manner.

<Operation of DMA controller 10>

The operation of the DMA controller 10 will be described referring to FIG. 7. The flowchart of FIG. 7 may illustrate that the service controller 108 of FIG. 2 operates under control of the microprogram control, or that the DMA controller 10 realizes its function by a hardware logic.

It is judged at step 7-1 if the designating signal CS has been supplied from the CPU 1 (i.e., if the signal CS has been made active)- When the signal is active, it is judged which signal, a read signal RD or a write signal WR, is supplied from the CPU 1. When the read signal RD is supplied, the operation goes to step 7-3, where the contents of the registers, which are designated by the address signals supplied via the address bus are output on the data bus, so that the CPU 1 can read them. When the write signal WR is supplied, the operation goes to step 7-4, where desired data will be set to the designated register via the data bus. The processes at steps 7-3 and 7-4 correspond to those at steps 5-5 and 5-18 in the main routine process of the CPU 1. Accordingly, the desired data will be set to the registers 104 and 105 of FIG. 2 respectively through the process at step 7-4.

When the CPU 1 terminates the accessing to or the programming of the DMA controller 10, the designating signal CS is set inactive, and the operation goes from step 7-1 to step 7-5.

It is judged at step 7-5 if the DMA transfer request signals DRQ1 to DRQ3 are supplied from the respective audio input/output devices 8-1 to 8-3, or if the DMA transfer request signal DREQ (DRQ4) is supplied from the HD controller 11. When the request is sent from any of the components, the operation goes to step 7-6, where the DMA enable signal DMAENB is set to "1" or active. Accordingly, only the DMA controller 10 uses the address bus and the data bus in the DMA unit, disabling any access from the CPU 1.

When multiple requests are made, the DMA controller 10 successively selects channels at step 7-7 in priority order of the channel, from CH1 down to CH4.

It is judged at step 7-8 if CH 4 of the address register 104 is selected, and a value of the transfer counter of CH 4 is "0". If CH 4 of the address register 104 is selected, and the value of the transfer counter of CH 4 is "0", i.e., if the transfer of data to be transferred from the CH 4 has been finished, data transfer will not be not executed any more even through the DMA transfer request signal is supplied. Then, the operation returns to step 7-5, and processes at steps 7-5 to 7-8 are repeatedly executed. If CH 4 is not selected, or if the value of the transfer counter is not "0" even though CH 4 is selected, the current address (the content of the current address register of CH 2 of the address register 104) of the selected channel (CH 2 in this case) is output to the address bus at step 7-9. The DMA controller 10 refers to the content of the control register 105 of the selected channel (CH 2 in this case), and decides at step 7-10 in which direction the DMA transfer is to be effected. When the DMA controller 10 decides to transfer data from the buffers 9-1 to 9-3 to the other components (I/O), the operation goes from step 7-11 to step 7-12, where the DMA controller 10 supplies the read signal RD to the buffer selected from among the buffers 9-1 to 9-3. When the data is to be transferred from the other components (I/O) to the buffers 9-1 to 9-3, the operation goes to step 7-13, where the DMA controller 10 supplies the write signal WR to the relevant buffer.

At step 7-14, the response signal DAK is made active. As a result, the audio input/output device 8-2 of the Tr2 in this case will output to the data bus audio data sampled in the processes at steps 6-7 and 6-8 of FIG. 6, and the DMA controller 10 will write the sampled audio data at the current address area in the buffer 9-2, as shown in FIG. 9.

Since the data transfer has been finished, the read signal RD or the write signal WR, and the response signal DAK are made inactive at step 7-15. At step 7-16, the DMA controller 10 increments the content retained at the current address (in the address register 104 of FIG. 2) of the relevant channel (CH2 in this case) by one. When the above content retained in the address register 104 has reached the final address of the buffer, the address register 104 is set to a start address of the buffer. The content of the address register 104 will be incremented or reset to the start address of the buffer through the process at step 7-16 every time other sampled audio data is written into or read out from the buffers 9-1 to 9-3. The operation returns from step 7-16 to step 7-1.

In the aforementioned case, the audio input/output devices 8-2 and 8-3 of Tr2 and Tr3 have made request for data transfer to the DMA controller 10 and the data transfer has been executed only in Tr2. Therefore, the DMA controller 10 judges "YES" at step 7-5. Through the processes at steps 7-7 to 7-11, 7-13 to 7-16, data is transferred in Tr3 from the audio input/output device 8-3 to the buffer 9-3 in the same manner as above.

After the data transfer is finished, the operation advances from step 7-5 to step 7-17, where the DMA controller 10 sets the DMA enabling signal to "0" (inactive). Then, the DMA controller 10 is prohibited from occupying the data bus and the address bus in the DMA unit, allowing the CPU 1 to access these buses.

With respect to the Tr2 and Tr3, the description of the data transfer from the audio input/output devices 8-2 and 8-3 to the respective buffers 9-2 and 9-3 has been given. Concerning Tr1, the DMA controller 10 executes data transfer in the opposite direction, i.e., from the buffer 9-1 to the audio input/output device 8-1.

The CPU 1 will execute data transfer between the buffers 9-1 to 9-3 corresponding to the track in operation and the hard disks 12a, 12b sequentially track by track, and the data transfer following the previous data transfer (block transfer) will be executed for each track. In the instance shown in FIG. 9, with respect to Tr1, data of the amount which corresponds to the empty space in the buffer 9-1 defined by the start address (CH 1) and the current address (CH 1) as shown in FIG. 9 is to be transferred from the hard disks 12a, 12b to the buffer 9-1. (With respect to the other tracks Tr2 and Tr3, it will be apparent that, though the direction of the data transfer is opposite, data transfer will be executed from the buffers 9-2 and 9-3 to the hard disks 12a, 12b under control of the DMA controller 10.) In the buffer 9-1 in the play mode and the buffers 9-2 and 9-3 in the record mode, the shaded portions correspond to the audio data which has been received.

Detecting the data transfer request made by the HD controller 11 at step 8-5, the DMA controller 10 performs the processes at steps 7-6 to 7-10 as done above, and then goes to step 7-11, where it judges whether the data transfer from the buffers 9-1 to 9-3 to the hard disks 12a, 12b is requested or the data transfer in the opposite direction is requested. When the former transfer is requested, the operation goes to step 7-12. When the latter transfer is requested, the operation goes to step 7-13, and then the processes at steps 7-14 to 7-16 are executed. In this case, since digital audio data for one sample is transferred in a single transfer operation, the block transfer will be done by repeatedly executing the processes at steps 7-5 to 7-16 for several times. The data transfer between the hard disks 12a, 12b and the buffers 9-1 to 9-3 will be further described later because the operation of the HD controller 11 is involved greatly.

When the DMA transfer has been completed, the transfer request signals DRQ1 to DRQ4 will not be sent forth, and the operation advances from step 7-5 to step 7-17, where the DMA controller 10 sets the DMA enabling signal DMAENB to "0" (inactive).

<Operation of HD Controller 11>

Figure 8:
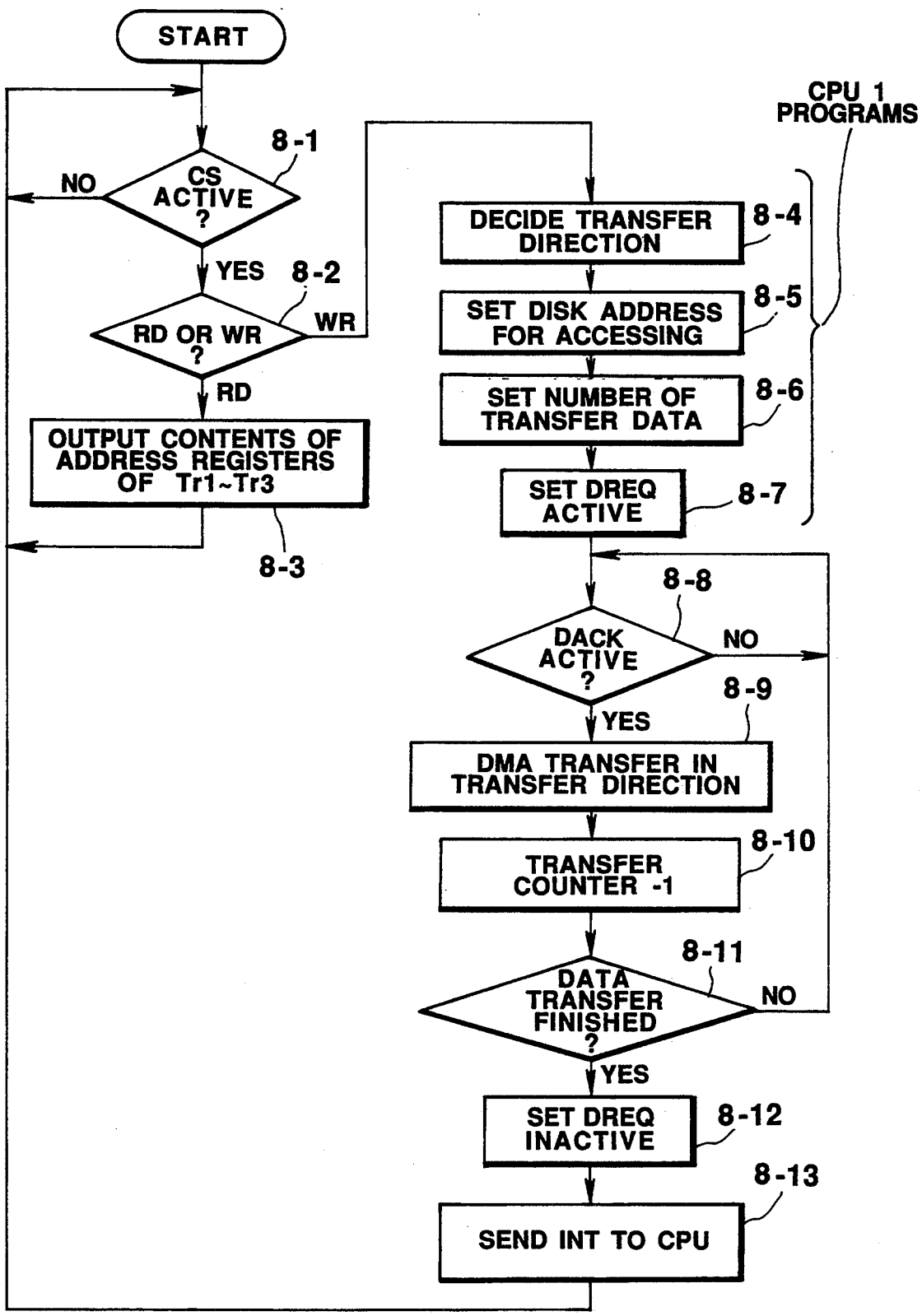
FIG. 8 is a flow chart of operation of HD controller of FIG. 1.

The operation of the HD controller 11 will now be explained referring to FIG. 8. The HD controller 11 may be realized by either a hardware logic or microprogram control; in either case, the operational flow in FIG. 8 can be accomplished.

First, it is judged at step 8-1 whether or not the designating signal CS has been given from the CPU 1; this signal is applied in the interrupt routine of the CPU 1. If the judgement is negative (NO), the operation returns to step 8-1 again, but if the judgement is positive, "YES", the operation goes to step 8-2. At this step 8-2, it is judged whether the read signal RD or the write signal WD is sent from the CPU 1. If it is the read signal RD, the designated data in the HD controller 11 (the content of the address register or the like) is sent through the data bus to the CPU 1.

If the write signal WR has been given from the CPU 1, the operation moves from step 8-2 to step 8-4 to set the direction of DMA transfer between the buffer and hard disks 12a, 12b, which are to be conducted in the channel CH4 of the DMA controller 10. At the following step 8-5, the access points of the hard disks 12a, 12b to be accessed are set by the access pointer for the track which the CPU 1 has acquired from the RAM 3.

At the subsequent step 8-6, the number of transfer data (the number of digital audio data) is set in an internal counter of the HD controller 11. This number of transfer data is obtained in the interrupt routine of the CPU 1.

As the processes at step 8-4 to 8-6 are executed, the HD controller 11 is programmed under the control of the CPU 1. Then, the HD controller 11 requests the DMA controller for data transfer at step 8-7. As will be understood from the above, upon receipt of the interrupt signal INT from the HD controller 11, the CPU 1 executes the setup and control of the DMA transfer in the next track (in the order of the Tr 1, Tr 2, Tr 3, Tr 1 ... provided that the Tr 1 to Tr 3 are all presently in operation) for the DMA controller 10, and programs the HD controller 11. Then, the CPU 1 leaves the control of the HD controller 11 and DMA controller 10, permitting these controllers to perform the DMA transfer through the mutual interaction.

Figure 7:
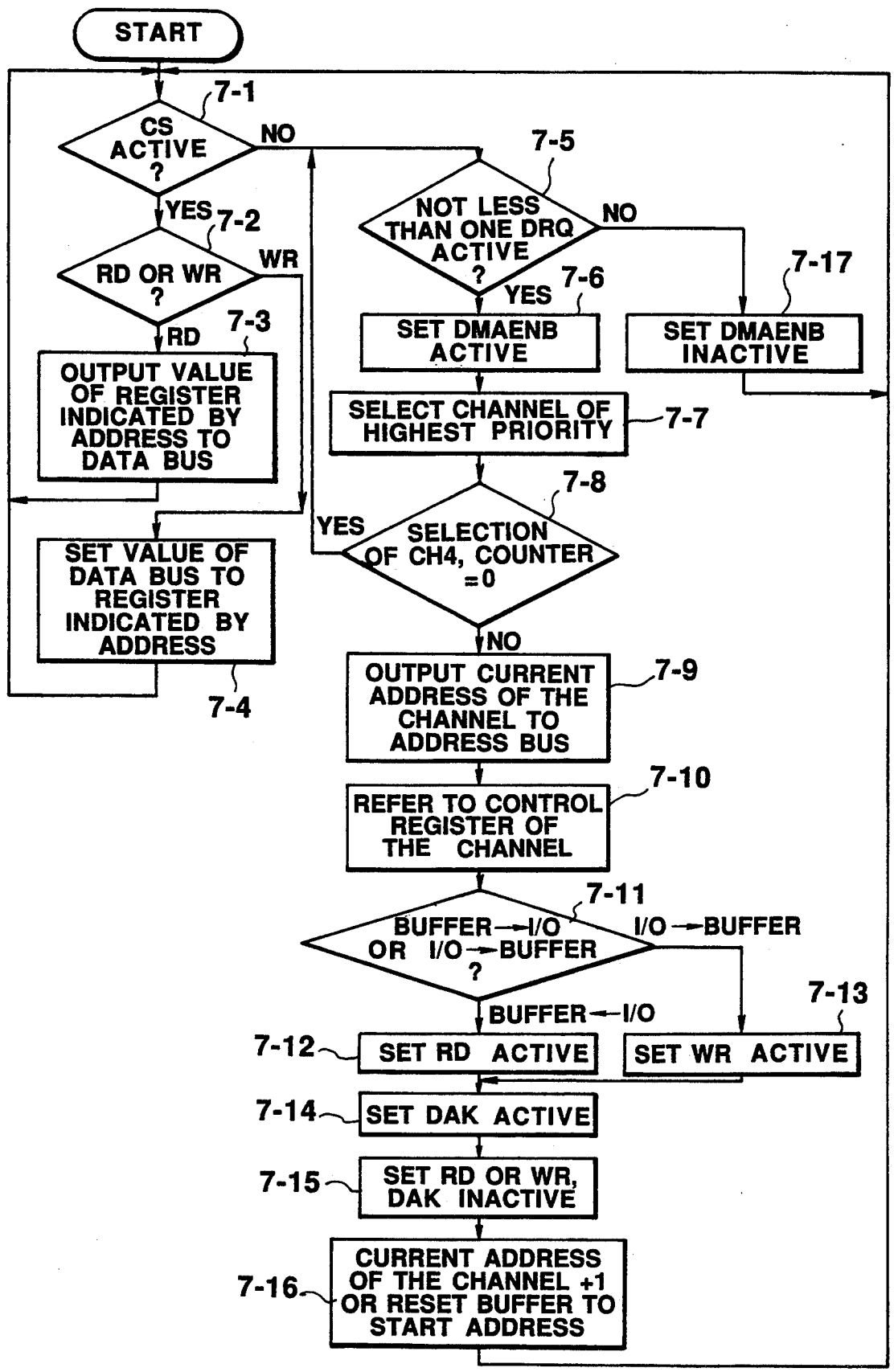
FIG. 7 is a flow chart of operation of DMA controller of FIG. 1.

The process of the HD controller 11 moves from step 8-7 to step 8-8, and executes repeatedly the process at step 8-8 until the HD controller 11 receives the response signal DACK (DAK4) from the DMA controller 10 (see step 7-14 of FIG. 7).

When the judgment at step 8-8 is affirmative, "YES", the operation advances to step 8-9, where digital audio data of one sample is transferred by the CH4 of the DMA controller 10, and the transfer counter set at step 8-6 is decremented by "1" at step 8-10. According to the content of the transfer counter, it is determined at step 8-11 whether data transfer of a previously set number of data has been completed. When the judgment is negative, "NO", the operation returns to step 8-8. Therefore, the DMA controller 10 continues receiving the transfer request DRQ4 until the data transfer of the previously set amount of data (block transfer) from the HD controller 11 is completed. In response to the transfer request, the DMA controller 10 executes the processes at steps 7-5 to 7-16 while HD controller 11 performs the processes at steps 8-8 to 8-11.

When it is Judged at step 8-11 that data transfer has been finished, the operation moves to step 8-12, where the data transfer request DREQ (DRQ4) from the HD controller 11 to the DMA controller 10 is set to "0" (inactive). The HD controller 11 sends the interrupt signal INT to the CPU 1 at step 8-13 to execute data transfer for the next track between the hard disk 12 and either of the buffers 9-1 to 9-3. In response to this interrupt signal INT, the CPU 1 executes the interrupt routine process as described above.

Although the several embodiments of the present invention have been described in detail, these embodiments are simply illustrative and not restrictive. The present invention may be modified in various manners. All the modifications and applications of the present invention are within the scope and spirit of the invention, so that the scope of the invention should be determined only by what is recited in the appended claims and their equivalents.

What is claimed is:

1. A digital recorder comprising:
   audio input/output means for performing an input-/output operation of an audio signal;
   memory medium means for storing an audio signal, and being accessed in predetermined units having a constant length corresponding to a plurality of sampling intervals;
   event defining means for dividing the audio signal stored in said memory medium means into a plurality of events;
   temporary storing means for temporarily storing audio signals which are input from said audio input/output means at sampling intervals and supplying the audio signal in the predetermined units to said memory medium means, and for temporarily storing the audio signal in the predetermined units input from said memory medium means and supplying the audio signal in sampling units to said audio input/out means; and
   access control means for effecting a fine-adjustment of access to the audio signal in said temporary storing means when the audio signal supplied from said memory medium means is temporarily stored in said temporary storing means in correspondence with a leading portion and an ending portion of the event, thereby allowing the audio signal of respective events to be reproduced at the sampling intervals.

2. A digital recorder according to claim 1, wherein said access control means includes controlling means for controlling to effect a dummy transfer of the audio signal which falls within a range from a very first portion of the predetermined unit to a portion corresponding to the leading portion of the event, from said memory medium means to said temporary storing means, when the leading portion of the event does not coincide with the predetermined unit, and to then effect a data transfer of the audio signal to actually input said audio signal to said temporary storing means.

3. A digital recorder according to claim 1, wherein said access control means includes controlling means for controlling to effect a data transfer of the audio signal falling within a range from a very first portion of the predetermined unit to a portion corresponding to the ending portion of the event, from said memory medium means to said temporary storing means, when the ending portion of the event does not coincide with the predetermined unit, and to effect thereafter a dummy transfer of the audio signal falling within another range remaining in said predetermined unit.

4. A digital recorder according to claim 1, wherein:
   said memory medium means comprises a disk medium, which effects access to data in predetermined units; and
   said access control means allows the audio signal to be output from said audio input/output means at the sampling intervals.

5. A digital recorder according to claim 1, wherein said memory medium means comprises a random-access type disk memory medium.

6. An audio reproducing apparatus comprising:
   audio output means for performing an output operation of an audio signal;
   memory medium means for previously storing an audio signal, and being accessed in predetermined units having a constant length corresponding to a plurality of sampling intervals;
   event defining means for dividing the audio signal stored in said memory means into a plurality of events;
   temporary storing means for temporarily storing the audio signal in the predetermined units input from said memory medium means, and for supplying the audio signal in sampling units to said audio output means; and
   access control means for effecting a fine-adjustment of access to the audio signal in said temporary storing means when the audio signal supplied from said memory medium means is stored in said temporary storing means in correspondence with a leading portion and an ending portion of the event, thereby allowing the audio signals of respective events to be reproduced at sampling intervals.

7. An audio reproducing apparatus according to claim 6, wherein said access control means includes controlling means for controlling to effect a dummy transfer of the audio signal which falls within a range from the very first portion of the predetermined unit to a portion corresponding to the leading portion of the event, from said memory medium means to said temporary storing means, when the leading portion of the event does not coincide with the predetermined unit, and to then effect a data transfer of the audio signal to actually input said audio signal to said temporary storing means.

8. An audio reproducing apparatus according to claim 6, wherein said access control means includes controlling means for controlling to effect a data transfer of the audio signal falling within a range from a very first portion of the predetermined unit to a portion corresponding to the ending portion of the event, from said memory medium means to said temporary storing means, when the ending portion of the event does not coincide with the predetermined unit, and to effect thereafter a dummy transfer of the audio signal falling within another range remaining in said predetermined unit.

9. An audio reproducing apparatus according to claim 6, wherein:
   said memory medium means comprises a disk medium, which effects access to data in predetermined units; and
   said access control means allows the audio signal to be output from said audio input/output means at the sampling intervals.

10. An audio reproducing apparatus according to claim 6, wherein said memory medium means comprises a random-access type disk memory medium.

11. A digital recorder according to claim 4, wherein said predetermined units comprise physical sector units.

12. A digital recorder according to claim 5, wherein said random-access type disk memory medium comprises a hard disk.

13. A digital recorder according to claim 5, wherein said random-access type disk memory medium comprises an optical disk.

14. A digital recorder according to claim 5, wherein said random-access type disk memory medium comprises a magneto optical disk.

15. An audio reproducing apparatus according to claim 9, wherein said predetermined units comprise physical sector units.

16. An audio reproducing apparatus according to claim 10, wherein said random-access type disk memory medium comprises a hard disk.

17. An audio reproducing apparatus according to claim 10, wherein said random-access type disk memory medium comprises an optical disk.

18. An audio reproducing apparatus according to claim 10, wherein said random-access type disk memory medium comprises a magneto optical disk.

* * * * *

UNITED STATES PATENT AND TRADEMARK OFFICE
CERTIFICATE OF CORRECTION

PATENT NO. : 5,343,451
DATED : August 30, 1994
INVENTOR(S) : Nobuo Iizuka It is certified that error appears in the above-identified patent and that said Letters Patent is hereby corrected as shown below:

Column 19, line 22, "input/out" should be --input/output--

Signed and Sealed this

Seventeenth Day of October, 1995

Attest:

BRUCE LEHMAN

*Attesting Officer*   *Commissioner of Patents and Trademarks*